United States Patent
Hemmer et al.

(10) Patent No.: US 8,167,203 B2
(45) Date of Patent: May 1, 2012

(54) CREDENTIAL READER HAVING A MICRO POWER PROXIMITY DETECTOR AND METHOD OF OPERATING THE CREDENTIAL READER

(75) Inventors: Steven George Hemmer, Lake Worth, FL (US); Charles Russell Eurich, Coconut Creek, FL (US)

(73) Assignee: UTC Fire & Security Americas Corporation, Inc., Bradenton, FL (US)

( * ) Notice: Subject to any disclaimer, the term of this patent is extended or adjusted under 35 U.S.C. 154(b) by 502 days.

(21) Appl. No.: 11/958,995

(22) Filed: Dec. 18, 2007

(65) Prior Publication Data

US 2009/0152352 A1 Jun. 18, 2009

(51) Int. Cl.
*G06K 7/00* (2006.01)
(52) U.S. Cl. ......... 235/439; 235/380; 235/435; 235/451
(58) Field of Classification Search .................. 235/439, 235/492, 441, 451, 380, 375
See application file for complete search history.

(56) References Cited

U.S. PATENT DOCUMENTS

| | | | | |
|---|---|---|---|---|
| 5,581,256 A | * | 12/1996 | McEwan | 342/27 |
| 5,933,812 A | * | 8/1999 | Meyer et al. | 705/15 |
| 6,206,293 B1 | * | 3/2001 | Gutman et al. | 235/493 |
| 6,476,708 B1 | * | 11/2002 | Johnson | 340/10.34 |
| 7,373,657 B2 | * | 5/2008 | Walker | 726/4 |
| 2001/0025887 A1 | * | 10/2001 | Murayama et al. | 235/492 |
| 2007/0090958 A1 | * | 4/2007 | Stilp | 340/572.8 |

* cited by examiner

*Primary Examiner* — Edwyn Labaze
(74) *Attorney, Agent, or Firm* — MH2 Technology Law Group, LLP

(57) ABSTRACT

An improved battery-powered credential reader, which may be used in security and other applications, includes include a micro-power proximity detector. The micro-power proximity detector is configured to lengthen battery life by reducing power consumption requirements of the credential reader during periods when no credential is present. An antenna formed about a perimeter of a printed circuit board is configured to propagate an electrostatic sense field adjacent to and through the credential reader using only microamps of electrical current. A control circuit of the micro-power proximity detector is configured to activate the credential reader from a "sleep" state when a disturbance in the electrostatic sense field caused by a credential is detected and/or registered.

17 Claims, 3 Drawing Sheets

CREDENTIAL READER HAVING A MICRO POWER PROXIMITY DETECTOR AND METHOD OF OPERATING THE CREDENTIAL READER

BACKGROUND

1. Field of the Invention

The field of the invention relates to identification systems generally, and more particularly to certain new and useful advances in micro-power credential readers, of which the following is a specification, reference being had to the drawings accompanying and forming a part of the same.

2. Discussion of Related Art

A credential is plastic card or other device that is configured to interface with a credential reader to identify a particular individual and one or more privileges associated with the individual and/or with a class to which the individual belongs. One example of a credential is an employee badge that is configured to open one or more locked doors and/or to disarm a security system.

Present credential readers use several techniques to detect the presence of a credential. One such technique is to energize the sense field (or "read field") on a continual basis to immediately read the credential when it is presented to the credential reader. The continual field technique is an industry standard, used across many types of credential readers. Another technique is to energize the sense field on a periodic basis (as with a burst of RF energy). A problem with both the continual field technique and the periodic field technique is that each technique requires far too much electrical power to be used in a battery-powered credential reader.

Another technique, perhaps more suitable to a battery-powered credential readers, emits infrared light and then detects the infrared light that is reflected off the credential. A problem with the infrared technique is that it still consumes too much power (e.g., milliamps), and thus shortens battery life. Another problem with the infrared technique is that it is susceptible to contaminates that may intentionally or unintentionally obscure the infrared light source and/or the infrared light detector.

A solution is needed that provides a battery-powered credential reader having a micro-power proximity detector configured to maximize battery life.

SUMMARY

The present disclosure describes an embodiment of a battery-powered credential reader having a micro-power proximity detector that projects a sense field outside a front of the credential reader to detect a presence of a credential at a predetermined range, which is on the order of a couple of centimeters, or less. The sense field may be an electrostatic field. Generating the sense field requires microamps—not milliamps as required by prior detection schemes.

Use of embodiments of the micro-power proximity detector permits the credential reader to occupy a "sleep" state, which requires little or no consumption of electrical power, during times when no credential is presented. The micro-power proximity detector monitors the sense field, and upon detecting a disturbance in the sense field commands the credential reader to activate. Once the credential reader activates (e.g., "wakes up"), it may proceed to read the credential, if a credential is present.

An advantage afforded by embodiments of the micro-power proximity detector is that it uses very small amounts of power—microamps instead of the milliamps previously required for detection of a credential—to allow increased battery life in a battery-operated credential reader. Another advantage is that embodiments of the micro-powered proximity detector work even in the presence of contaminates, and/or ambient light, that would disrupt the operation of an infrared credential reader.

Other features and advantages of the disclosure will become apparent by reference to the following description taken in connection with the accompanying drawings.

BRIEF DESCRIPTION OF THE DRAWINGS

Reference is now made briefly to the accompanying drawings, in which.

Like reference characters designate identical or corresponding components and units throughout the several views, which are not to scale unless otherwise indicated.

DETAILED DESCRIPTION

Specific configurations and arrangements of the claimed invention, discussed below with reference to the accompanying drawings, are for illustrative purposes only. Other configurations and arrangements that are within the purview of a skilled artisan can be made without departing from the spirit and scope of the appended claims.

As used herein, an element or function recited in the singular and proceeded with the word "a" or "an" should be understood as not excluding a plurality of said elements or functions, unless such exclusion is explicitly recited. Furthermore, references to "one embodiment" of the claimed invention should not be interpreted as excluding the existence of additional embodiments that also incorporate the recited features.

Figure 1:
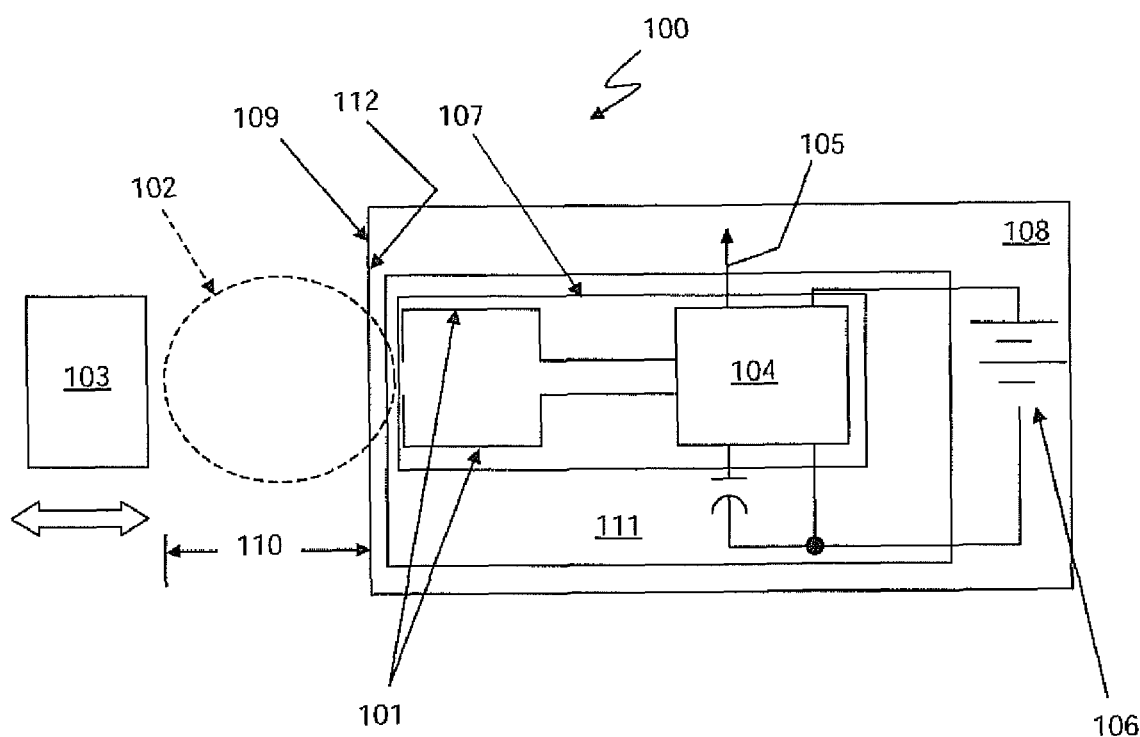
FIG. 1 is a diagram of a micro-power, battery-operated credential reader system having an embodiment of a micro-power proximity detector.

FIG. 1 is a diagram of a micro-power, battery-operated credential reader system 100 (hereinafter, "system 100"). In FIG. 1, a sense field 102 is illustrated in phantom lines to indicate that the sense field 102 is present only when the micro-power proximity detector 107 operates. The system 100 may include a battery-operated credential reader 108 (hereinafter "credential reader 108"), a credential 103, and a micro-power proximity detector 107. The credential reader 108 may include a power source 106. In an embodiment, the power source 106 may be one or more batteries.

The micro-power proximity detector 107 may include an antenna 101 and a control circuit 104 that is coupled with the antenna 101. The control circuit 104 may also be coupled with the power source 106. In an embodiment, the control circuit 104 and the antenna 101 may be formed on a printed circuit board 111 that forms part of the credential reader 108. Although not shown for ease of illustration, the control circuit 104, and the printed circuit board 111 may include electrical and/or digital components such as one or more capacitors, diodes, memories, processors, resistors, switches, traces, vias, and the like.

The antenna 101 is formed of any electrically conductive material, and is configured to couple with a sense field 102, which is an electrostatic field generated by appropriate electronics of the control circuit 104 using microamps of electrical current from the power source 106 in accordance with known principles of charge transfer. The antenna 101 thus becomes a charged electrode, and antenna 101 is configured to propagate the electrostatic sense field to extend adjacent to a surface 109 of the credential reader 108, and to extend into and through a local dielectric 112. In an embodiment, the local dielectric 112 is a material, such as plastic, that comprises the housing of the credential reader 108. The local dielectric 112 and the sense field 102 around it thus become a proximity sensor, which is configured to detect and register a disturbance in the electrostatic sense field 102.

The disturbance in the electrostatic sense field 102 may be any change in the proximity environment that causes a change in a current flow through the sense field 102. The current flow through the sense field 102 will change whenever an object with virtual capacitance is introduced into the sense field 102 or is removed from the sense field 102. The detection and/or registration of the change in current flow is used to activate higher-power circuitry within the credential reader 108 to read the credential 103 and determine whether to grant or deny access. The higher-power circuitry can include a second antenna (not shown).

Generally speaking, the actual credential itself may be too small to cause a disturbance in the sense field 102 that will be registered. Instead, a registered disturbance in the sense field 102 is typically a combination of the credential and any surrounding environmental effects, such as a hand holding the credential. In such a case, the hand holding the credential has a virtual capacitance and provides an electrostatic drain on the sense field 102 by virtue of current flow through the body of the person holding the credential. In an embodiment, a credential 103 of sufficient size and virtual capacitance may disturb the sense field 102 to activate the credential reader 108 in the absence of a hand or other object.

In an embodiment, the antenna 101 may be placed at an outer boundary of the circuit board 111 to project the sense field 102 a predetermined distance 110 beyond the surface 109 of the credential reader 108 to detect a presence of the credential 103. The antenna 101 can be comprised of any small metallic mass. In one embodiment, the mass is one or more copper traces etched directly onto the perimeter of the printed circuit board 111. In another embodiment, the mass is a wire coupled with the printed circuit board 111. Since most credentials 103 tend to be generally rectangular in shape, the enclosure of the credential reader 108, the printed circuit board 111 within it, and the antenna 101 disposed about the printed circuit board's perimeter, tend to be generally rectangular in the embodiment illustrated in FIG. 1. However, this is not a limitation or a requirement, as any other suitable shapes may be used. In any case, care is taken to design the control circuit 104 with an awareness of the type of metallic mass and the location of the antenna 101 on the printed circuit board 111 to guarantee proper operation.

In an embodiment, about fifteen (15) microamps or less of electrical current may be required to generate the sense field 102. In an embodiment, the predetermined distance 110 of the sense field 102 may extend outwardly from the surface 109 of the credential reader 108 in a range of about 0 cm to about 7.62 cm, and all subranges therebetween.

The control circuit 104 may be configured to perform one or more functions. The control circuit 104 may also be configured to detect and/or register a disturbance in the sense field 102 caused when an object having a virtual capacitance, enters the sense field 102.

The disturbance may be a change in an electrical charge of the sense field. In an embodiment, the electrical charge may be a net electrical charge of the sense field. For example, a disturbance may be caused when a positively (+) charged object, such as hand holding a credential 103, is placed within the negatively (−) charged sense field 102 described above. In effect, the presence of the positively (+) charged credential lessens (or balances) the sense field's net negative (−) electrical charge.

The control circuit 104 may be further configured to generate a command signal 105 when the disturbance in the sense field 102 is detected and/or registered. The command signal 105 may be configured to activate the credential reader 108 from the "sleep" state, discussed above, so the credential reader 108 reads, or attempts to read, data from the credential 103. In an embodiment, access to an area protected by the credential reader 108 may be granted or denied after reading the credential 103.

Figure 2:
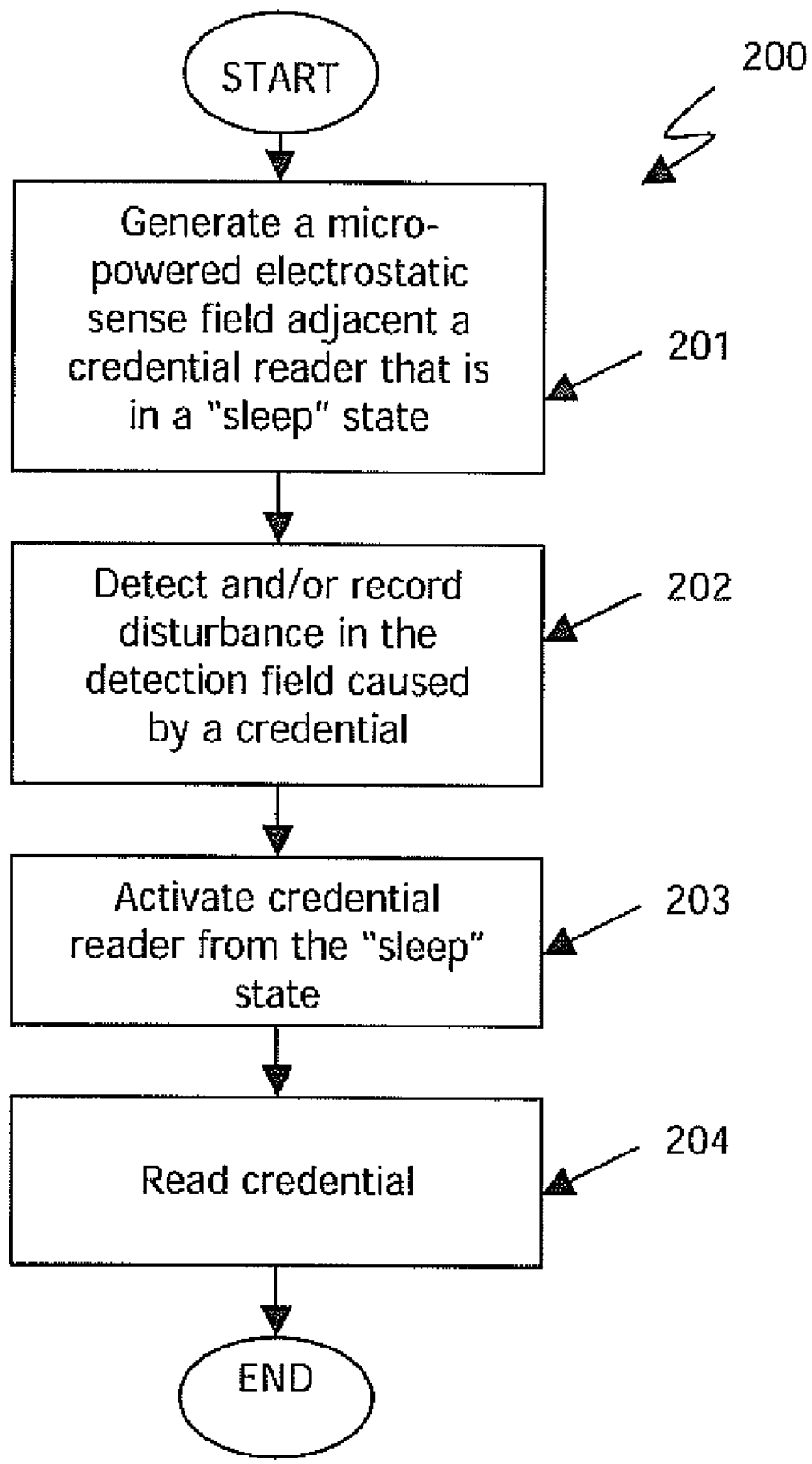
FIG. 2 is a flowchart illustrating functions of a method for operating a battery operated credential reader having an embodiment of the micro-power proximity detector.

FIG. 2 is a flowchart illustrating functions of a method 200 for operating a battery operated credential reader 108 having an embodiment of the micro-power proximity detector 107 of FIG. 1. The functional blocks 201, 202, 203, and 204 of the flowchart in FIG. 2 represent functions of the method 200. Unless otherwise noted, the functions represented by the functional blocks 201, 202, 203, and 204 may be performed simultaneously, sequentially, or in any suitable order.

Referring to FIGS. 1 and 2, the method 200 may begin, as represented by functional block 201, by generating a sense field 102 adjacent to a credential reader 108 that is in a "sleep" state. The sense field 102 may be a micro-powered electrostatic sense field.

As represented by functional block 202, the method 200 may further include detecting a disturbance in the sense field 102 caused by an object having a virtual capacitance.

As represented by functional block 203, the method 200 may further include generating a command signal 105 that causes the credential reader 108 to activate from a "sleep" state.

As represented by functional block 204, the method 200 may further include reading the credential 103. Reading the credential 103 may include receiving data, or a data signal, from the credential 103, storing the received data, and/or processing the received data. The received data may be stored in a memory device, and may be processed by a computer processor.

Thereafter, the method 200 may end.

In an embodiment, the sense field 102 is self-calibrating. A non-limiting example will make this clear. After an embodiment of the credential reader 108 is installed next to a door, it will properly operate by detecting disturbances in the sense field 102 that are caused by the presence of both a hand and a credential. If, at a later time, a large metal cabinet is moved adjacent to the credential reader 108, the cabinet will constitute a disturbance that activates the credential reader 108. Of course, with no credential present, the credential reader 108 will take no further action and will shut off, or enter a "sleep" state. A predetermined time later, a processor coupled with the micro-power proximity detector 107 will determine that the disturbance in the sense field 102 caused by the large metal cabinet is not temporary, but actually a permanent change in the local environment. Upon making this determination, the micro-power proximity detector 107 will recalibrate itself to the new local environment by accounting for the disturbance caused by the large metal cabinet. After self-calibrating, the micro-power proximity detector 107 will again be capable of properly detecting the presence of both a hand and a credential.

Figure 3:
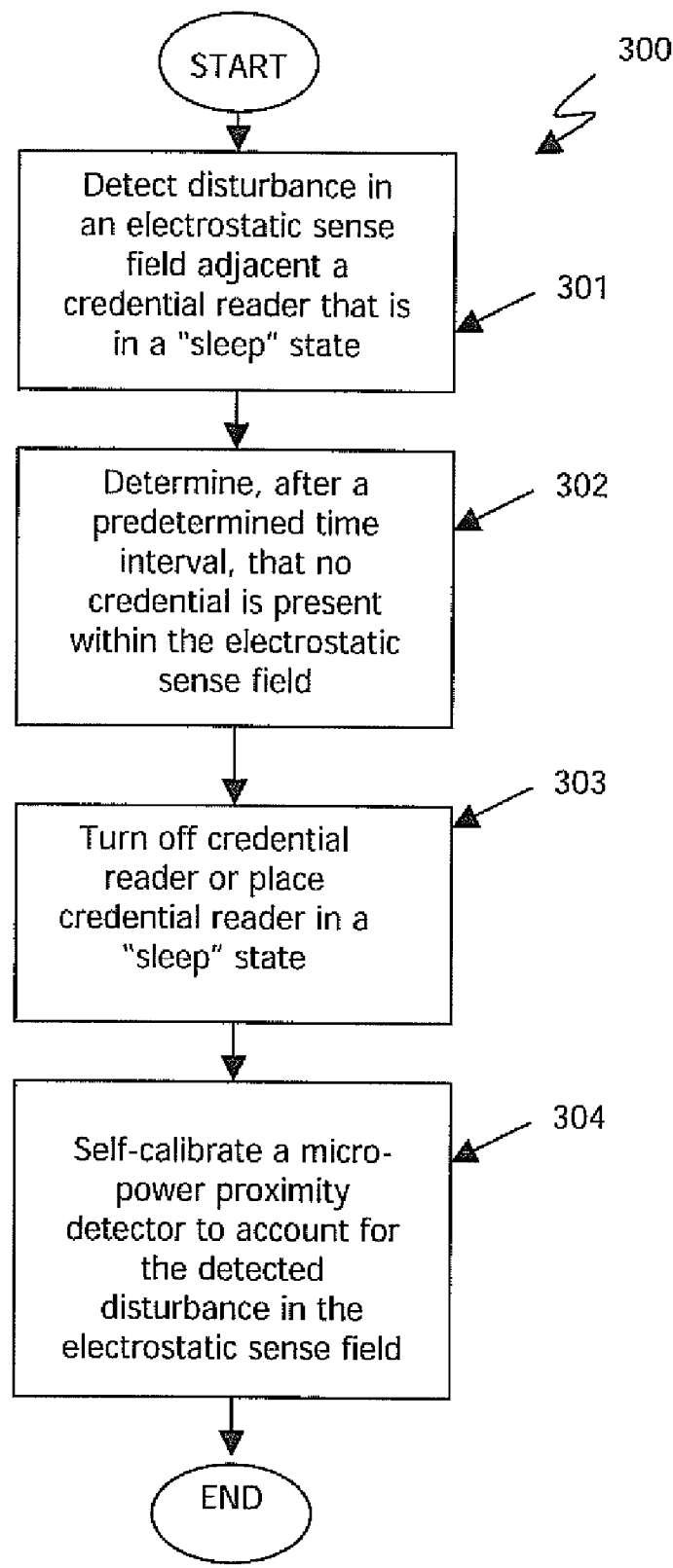
FIG. 3 is a flowchart illustrating a method of self-calibrating a micro-power proximity detector.

FIG. 3 is a flowchart illustrating an embodiment of a method 300 of self-calibrating the micro-power proximity detector 107 of FIG. 1. The functional blocks 301, 302, 303, 304 of the flowchart in FIG. 3 represent functions of the method 300.

Referring to FIGS. 1 and 3, the method 300 may begin, as represented by functional block 301, by detecting a disturbance in a sense field 102, which is generated by a micro-power proximity detector 107 of a credential reader 108, as previously described.

As represented by functional block 302, the method 300 further includes determining that no credential 103 is present within the disturbed sense field 102. In one embodiment, this may be accomplished by activating the credential reader 108, attempting to read data from a credential 103, and thereafter not receiving any data from the credential 103 for a predetermined time interval, which may range from and include about 10 seconds to about 15 seconds.

As represented by functional block 303, the method 300 further includes one of turning off the credential reader 108 or placing the credential reader 108 into a "sleep" state. This may be accomplished by generating a command signal to the credential reader after the predetermined time interval has expired and no data has been received from the credential 103.

As represented by functional block 304, the method 304 further includes self-calibrating the micro-proximity detector to account for the disturbance detected in the sense field 102.

Thereafter, the method 300 may end.

Referring again to FIG. 1, in an embodiment a technical effect afforded by an embodiment of the invention is to lengthen battery life in a battery-powered credential reader. Another technical effect is to propagate a micro-powered electrostatic field 102 to extend into and through a local dielectric 112, which forms part of the battery-powered credential reader 108, so a credential 103 can be detected with minimal power consumption.

Although specific features of various embodiments of the invention may be shown in some drawings and not in others, this is for convenience only. In accordance with the principles of the invention, the feature(s) of one drawing may be combined with any or all of the features in any of the other drawings. The words "including", "comprising", "having", and "with" as used herein are to be interpreted broadly and comprehensively and are not limited to any physical interconnection.

Moreover, any embodiments disclosed herein are not to be interpreted as the only possible embodiments. For example, the negatively (−) charged sense field described above may be replaced by a positively (+) charged sense field. In such a case, a negatively (−) charged object may be substituted for the positively (+) charged object mentioned above to create the disturbance that triggers generating the command signal. Thus, these and other modifications and embodiments are intended to be included within the scope of the appended claims.

What is claimed is:

1. A credential reader comprising:
a power source; and
a micro-power proximity detector coupled with the power source, the micro-power proximity detector comprising:
an antenna configured to couple with a sense field adjacent the credential reader; and
a control circuit coupled with the antenna and with the power source, the control circuit configured to detect and register a disturbance in the sense field and configured to activate circuitry of the control circuit to read a credential when the disturbance in the sense field is detected, wherein the control circuit is configured to detect a disturbance in the sense field caused when an object having a virtual capacitance enters the sense field.

2. The credential reader of claim 1, wherein the power source comprises one or more batteries.

3. The credential reader of claim 1, wherein the control circuit is configured to generate the sense field with microamps of current from the power source.

4. The credential reader of claim 1, wherein the disturbance is a change in an electrical charge of the sense field.

5. The credential reader of claim 4, wherein the electrical charge is a net electrical charge of the sense field.

6. The credential reader of claim 1, wherein the control circuit is configured to generate a command signal when the disturbance in the sense field is detected.

7. The credential reader of claim 6, wherein the command signal is configured to activate the credential reader from a sleep state.

8. The credential reader of claim 1, wherein the sense field is an electrostatic field.

9. A method comprising:
generating an electrostatic sense field adjacent to a credential reader;
detecting and registering a disturbance in the electrostatic sense field caused by a credential;
activating circuitry to generate a command signal configured to activate the credential reader from a sleep state when the disturbance is detected;
reading the credential with the credential reader when the credential reader is activated.

10. The method of claim 9, wherein the electrostatic sense field is generated using microamps of electrical current from a power source.

11. The method of claim 10, wherein the power source is one or more batteries.

12. The method of claim 9, wherein the disturbance is a change in an electrical charge of the electrostatic sense field.

13. The method of claim 12, wherein the electrical charge is a net electrical charge of the electrostatic sense field.

14. A credential reader comprising:
a printed circuit board;
an antenna formed about a perimeter of the printed circuit board and configured to couple with an electrostatic sense field, wherein the antenna is configured to propagate the sense field to extend adjacent to a surface of the credential reader, and to extend into and through a local dielectric; and
a control circuit formed on the printed circuit board, wherein the control circuit is coupled with a power source and configured to draw microamps of power from the power source to generate the electrostatic sense field, wherein the control circuit is further configured to detect and register a disturbance in the electrostatic sense field and to activate higher-power circuitry within the credential reader to read the credential when the disturbance is detected.

15. The credential reader of claim 14, wherein the local dielectric is a material that comprises a housing of the credential reader.

16. The credential reader of claim 14, wherein the disturbance in the electrostatic sense field is any change in a proximity environment that causes a change in a current flow through the electrostatic sense field.

17. A method comprising:
detecting a disturbance in an electrostatic sense field, which is generated by a micro-power proximity detector of a credential reader;
activating the credential reader;
attempting to read data from a credential;
if data from the credential is not received for a predetermined time interval, determining that no credential is present within the disturbed electrostatic sense field;
turning off the credential reader or placing the credential reader into a sleep state in response to determining that no credential is present; and
self-calibrating the micro-power proximity detector to account for the disturbance detected in the sense field.

* * * * *